J. H. MORRIS.
ANIMAL-TRAP.

No. 179,940.                Patented July 18, 1876.

WITNESSES:
A. W. Almqvist
John Goethals

INVENTOR:
J. H. Morris
Munn & Co.
ATTORNEYS.

UNITED STATES PATENT OFFICE.

JOHN H. MORRIS, OF SEWARD, NEBRASKA.

IMPROVEMENT IN ANIMAL-TRAPS.

Specification forming part of Letters Patent No. 179,940, dated July 18, 1876; application filed June 6, 1876.

Figure 1:
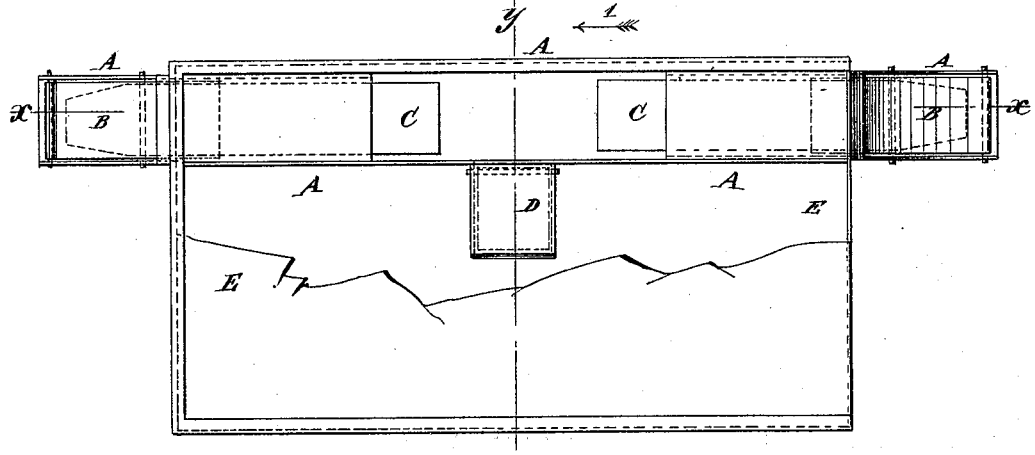
Figure 2:
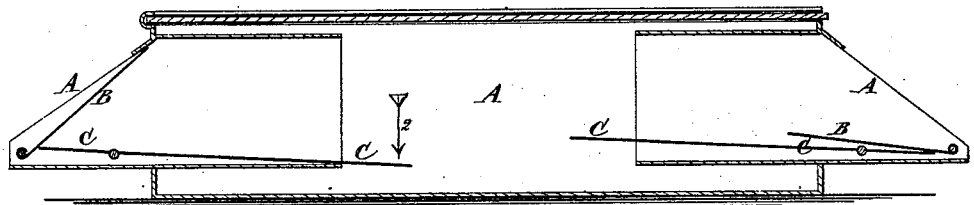
Figure 3:
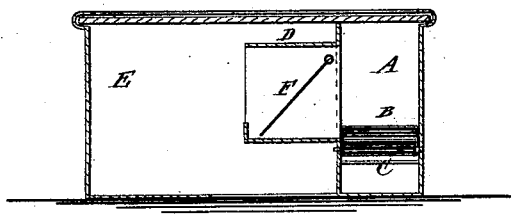

To all whom it may concern:

Be it known that I, JOHN H. MORRIS, of Seward, in the county of Seward and State of Nebraska, have invented a new and useful Improvement in Animal-Trap, of which the following is a specification:

Figure 1 is a top view of my improved trap, part of the top being broken away to show the construction. Fig. 2 is a vertical longitudinal section of the same, taken through the line $x\,x$, Fig. 1. Fig. 3 is a vertical cross-section of the same, taken through the line $y\,y$, Fig. 1, and looking in the direction indicated by arrow 1.

Similar letters of reference indicate corresponding parts.

The object of this invention is to furnish an improved trap for catching animals, for the entrance of stock-yards, for the chutes through which cattle are loaded upon cars, and for other similar uses, which shall be so constructed as to remain open except when an animal may attempt to go out, and which will again open as soon as he desists from his attempt.

The invention consists in the combination of the hinged gate and the tilting platform with the end or ends of a passage, and in the combination of the second passage, the box, and the drop-gate with the main passage, provided at one or both ends with a hinged gate and a tilting platform, as hereinafter fully described.

A is a narrow passage-way, the entrance of which is inclined, and is provided with a door or gate, B, hinged at its lower end, so that it may swing up to close said entrance, as shown in the left-hand part of Fig. 2. In the passage A is pivoted a tilting platform, C, the outer end of which rests against the under side of the gate B, and which is so balanced that the weight of the said gate B may press down the outer end, and raise the inner end of the said platform C, as shown in the right-hand part of Fig. 2.

With this construction, when the platform C is left free, the gate B will always be open. With this construction, as the animal walks upon the gate B in entering the passage A everything seems firm, and the animal sees nothing that he thinks would prevent his return. As the animal steps from the gate B upon the tilting platform C his weight tilts the said platform and closes the gate B, and holds it closed as long as he remains upon the platform C. As soon as the animal steps from the platform C the gate B opens by its own weight, and remains open until an animal again steps upon the inner part of the said platform, when the gate will be again closed.

In the case of a trap for catching animals a gate, B, and tilting platform C may be placed at each end of the passage A, as shown in Figs. 1 and 2. In this case, also, a passage, D, is formed, leading from the passage A into a box, E, secured to the side of the said passage A. The passage D is provided with a drop-gate, F, which may be raised by an animal passing through the said passage D from the passage A, but cannot be opened by an animal from the box E.

When used for catching animals, the passage A and box E should be covered, in whole or in part, with a glass plate to admit light.

Having thus described my invention, I claim as new and desire to secure by Letters Patent—

1. The combination of the hinged gate B and the tilting platform C with the end or ends of the passage A, substantially as herein shown and described.

2. The combination of the passage D, the box E, and the drop-gate F with the passage A, provided at one or both ends with a hinged gate, B, and a tilting platform, C, substantially as herein shown and described.

JOHN H. MORRIS.

Witnesses:
HENRY MORRIS,
A. H. DENISON.